(12) United States Patent
Schehrer

(10) Patent No.: US 11,846,350 B2
(45) Date of Patent: Dec. 19, 2023

(54) DAMPER APPARATUS FOR A BELT ELEMENT OF A BELT TRANSMISSION

(71) Applicant: Schaeffler Technologies AG & Co. KG, Herzogenaurach (DE)

(72) Inventor: Nicolas Schehrer, Eschau (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 355 days.

(21) Appl. No.: 17/268,515

(22) PCT Filed: Sep. 19, 2019

(86) PCT No.: PCT/DE2019/100826
§ 371 (c)(1),
(2) Date: Feb. 15, 2021

(87) PCT Pub. No.: WO2020/064053
PCT Pub. Date: Apr. 2, 2020

(65) Prior Publication Data
US 2021/0262553 A1   Aug. 26, 2021

(30) Foreign Application Priority Data
Sep. 25, 2018   (DE) .......... 10 2018 123 597

(51) Int. Cl.
*F16H 9/12* (2006.01)
*F16H 9/16* (2006.01)
*F16H 9/24* (2006.01)

(52) U.S. Cl.
CPC .............. *F16H 9/125* (2013.01); *F16H 9/16* (2013.01); *F16H 9/24* (2013.01)

(58) Field of Classification Search
CPC .............. F16H 9/125; F16H 9/16; F16H 9/24
(Continued)

(56) References Cited

U.S. PATENT DOCUMENTS 6,435,994 B1 * 8/2002 Friedmann ................ F16H 9/18
474/18
9,382,982 B2 * 7/2016 Werny ....................... F16H 7/18
(Continued)

FOREIGN PATENT DOCUMENTS

| CN | 107429804 A | 12/2017 |
|---|---|---|
| CN | 108027060 A | 5/2018 |

(Continued)

*Primary Examiner* — Gene O Crawford
*Assistant Examiner* — Emily R Kincaid

(57) ABSTRACT

A damper apparatus for a belt element of a belt transmission includes a sliding surface, a bearing receptacle, a first rail half and a second rail half. The sliding surface is arranged to contact a strand of the belt element to dampen the belt element. The bearing receptacle is arranged to align the sliding surface with the strand such that the sliding surface defines a strand travel direction, normal to a transversal direction. The first rail half has a first plunge opening with a first hook lid, and the second rail half has a second plunge opening with a second hook lid. The first rail half and the second rail half are interlockingly connected in contact to each other crosswise to the strand travel direction, and the first hook lid is arranged to plunge into the second plunge opening behind the second hook lid in a gripping manner.

10 Claims, 3 Drawing Sheets

(58) Field of Classification Search
USPC .............................................................. 474/8
See application file for complete search history.

(56) References Cited

U.S. PATENT DOCUMENTS

| | | | |
|---|---|---|---|
| 2015/0176684 A1* | 6/2015 | Werny | .................... F16H 9/125 |
| | | | 474/140 |
| 2016/0238111 A1* | 8/2016 | Penner | ...................... F16H 9/24 |
| 2018/0119781 A1* | 5/2018 | Werny | ...................... F16H 7/18 |

FOREIGN PATENT DOCUMENTS

| CN | 111615600 A | 9/2020 |
|---|---|---|
| DE | 10017005 A1 | 10/2000 |
| DE | 102013213163 A1 | 1/2014 |
| DE | 102015201618 A1 | 8/2015 |
| JP | 2012102857 A | 5/2012 |
| WO | 2014012741 A1 | 1/2014 |
| WO | 2015021986 A1 | 2/2015 |
| WO | 2016127983 A1 | 8/2016 |

* cited by examiner

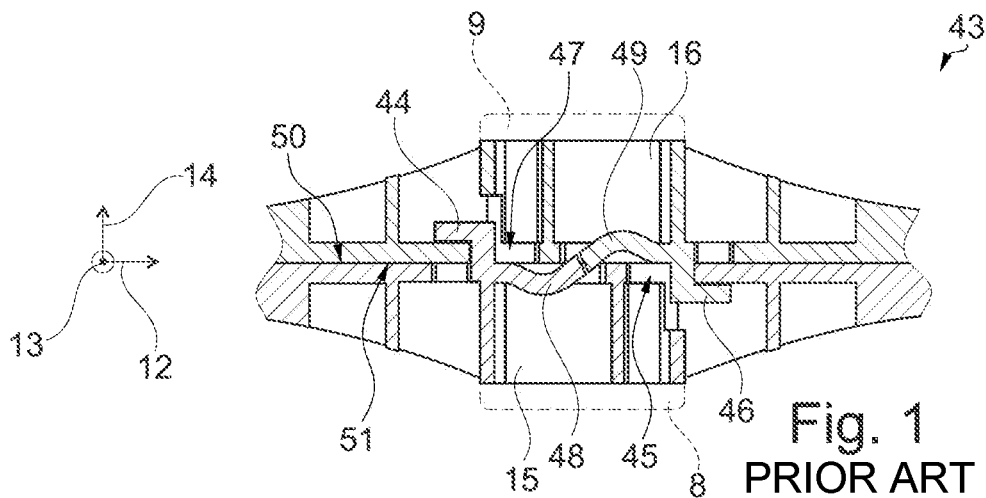
Fig. 1 PRIOR ART
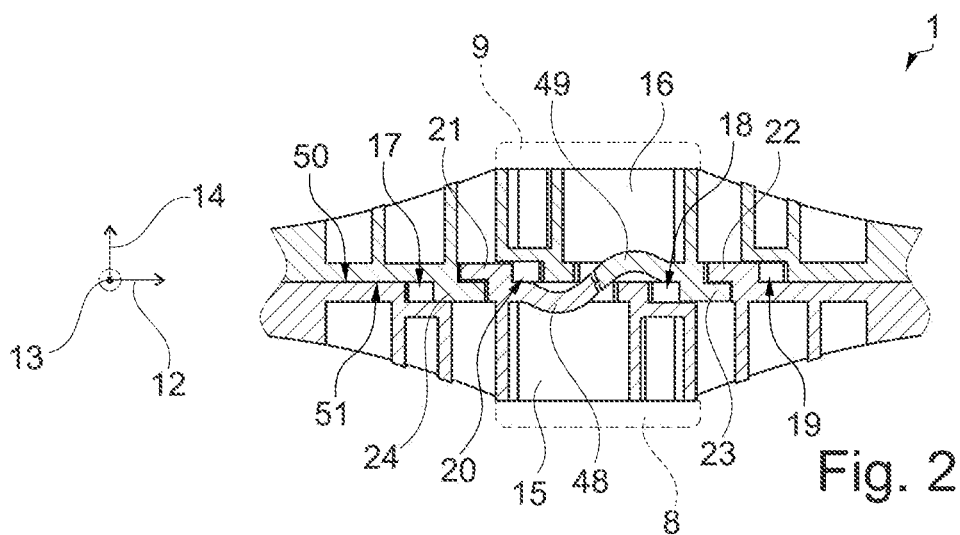
Fig. 2
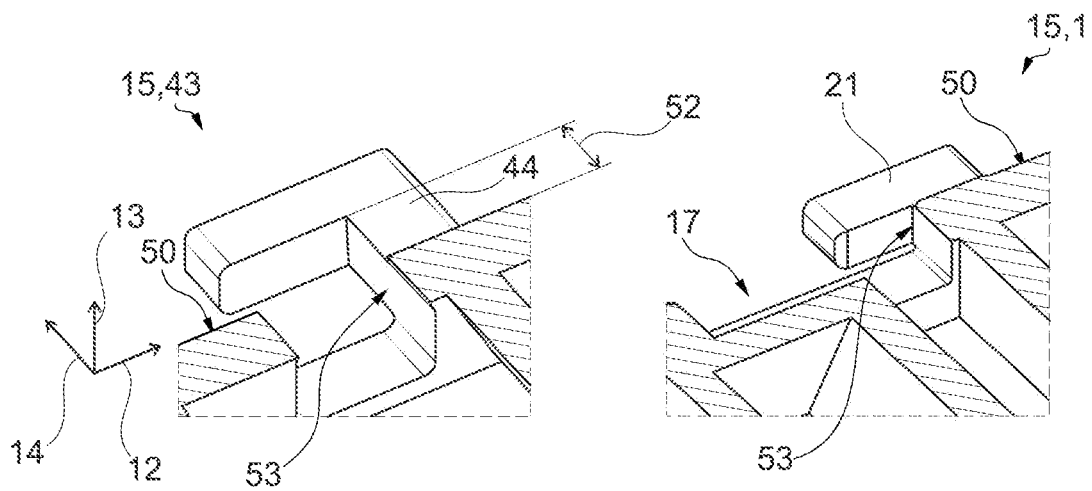
Fig. 3 PRIOR ART
Fig. 4

DAMPER APPARATUS FOR A BELT ELEMENT OF A BELT TRANSMISSION

CROSS-REFERENCE TO RELATED APPLICATIONS

This application is the United States National Phase of PCT Appln. No. PCT/DE2019/100826 filed Sep. 19, 2019, which claims priority to German Application No. DE102018123597.6 filed Sep. 25, 2018, the entire disclosures of which are incorporated by reference herein.

TECHNICAL FIELD

The disclosure relates to a damper apparatus for a belt element of a belt transmission, a belt transmission having such a damper apparatus, a drive train having such a belt transmission, and a motor vehicle having such a drive train.

BACKGROUND

A belt transmission, also referred to as a cone pulley belt transmission or CVT (continuous variable transmission), for a motor vehicle, includes a first cone pulley pair arranged on a first shaft and a second cone pulley pair arranged on a second shaft, as well as a belt element provided for torque transmission between the cone pulley pairs. A cone pulley pair has two cone pulleys which are oriented with corresponding conical surfaces to each other and are axially movable relative to each other.

Such a belt transmission regularly includes at least a first cone pulley pair and a second cone pulley pair, each having a first cone pulley that can be displaced along the shaft axis, also referred to as a loose pulley or a travel pulley, and a second cone pulley that is fixed in the direction of the shaft axis, also referred to as a fixed pulley. The belt element, provided for transmitting torque between the cone pulley pairs as a result of a relative axial movement between the loose disc and the fixed disc as a result of the conical surfaces, runs on a variable radius of action, i.e., with a variable running radius. As a result, a different rotational speed transmission ratio and torque transmission ratio can be continuously adjusted from one cone pulley pair to the other cone pulley pair.

Such belt transmissions have long been known, for example from DE 100 17 005 A1 or WO 2014/012 741 A1. During operation of the belt transmission, the belt element is shifted in a radial direction between an inner position (small radius of action) and an outer position (large radius of action) by the relative axial movement of the cone pulleys, thus on the cone pulley pairs. The belt element forms two strands between the two cone pulley pairs, and, depending on the configuration and the direction of rotation of the cone pulley pairs, one of the strands forms a driving strand and the other strand forms a slack strand, or a load strand and an empty strand.

In such belt transmissions, a damper apparatus is provided in the space between the cone pulley pairs. Such a damper apparatus can be arranged on the driving strand and/or on the slack strand of the belt element, and is used to guide and thus to limit vibrations of the belt element. Such a damper apparatus is to be designed primarily with regard to an acoustically efficient traction means guide (belt element guide). The length of the system for guiding the belt element and the stiffness of the damper apparatus are decisive influencing factors. A damper apparatus is designed, for example, as a slide shoe or as a sliding guide with only one-sided, usually space-dependent (transverse to the belt element) inside contact surfaces, i.e., arranged between the two strands. Alternatively, the damper apparatus is designed as a slide rail with a contact surface on both sides, i.e., both on the outside, i.e., outside of the belt loop formed, and also on the inside contact surface for the relevant strand of the belt element.

The direction perpendicular to the (respective) strand and pointing from the inside to the outside or vice versa is called the transversal direction. The transversal direction of the first strand is therefore parallel to the transversal direction of the second strand only if the running radii on the two cone pulley pairs are the same. The direction perpendicular to the strands and pointing from one cone pulley to the other cone pulley of a cone pulley pair is referred to as the axial direction. Thus, this is a direction parallel to the axes of rotation of the cone pulley pairs. The direction in the (ideal) plane of the (respective) strand is called the travel direction or the opposite travel direction or the longitudinal direction. The travel direction, transversal direction and axial direction thus span a Cartesian coordinate system that is moved along (during operation). The aim is that the travel direction forms the ideally shortest connection between the adjacent running radii of the two conical pulley pairs, but in dynamic operation the alignment of the respective strand can deviate temporarily or permanently from this ideally shortest connection.

The damper apparatus is mounted by a bearing receptacle on a pivoting means having a pivot axis, which enables the damper apparatus to be pivoted about the pivot axis. In some applications, the damper apparatus can also be moved transversely, so that the damper apparatus follows a (steeper oval) curve, which deviates from a circular path around the pivot axis. The pivot axis thus forms the center of a (two-dimensional) polar coordinate system, and the (pure) pivot movement thus corresponds to the change in the polar angle and the transverse movement corresponding to the change in the polar radius. This translational movement which is overlaid, i.e., superimposed, on the pivot movement is summarized below for the sake of clarity and under the term pivot movement. The pivot axis is oriented transversely to the travel direction of the belt element, i.e., axially. This ensures that when the radii of action (running radii) of the belt transmission are adjusted, the damper apparatus can be guided following the resulting new (tangential) orientation of the belt element.

To increase the dampening effect and thus (primarily) reduce noise emissions, the aim thus far is to achieve the longest possible (longitudinal) extent of the sliding surfaces and to achieve the highest possible stiffness of the sliding surfaces. This is difficult given the requirement for a smallest possible installation space and at the same time the need to adjust the damper apparatus. However, the latest internal findings and more precise simulation models have surprisingly shown that only the longest possible extent and the greatest possible stiffness of the sliding surface do not meet all load events, and in particular not all vibration excitations.

SUMMARY

The disclosure relates to a damper apparatus for a belt element of a belt transmission, having a sliding surface and a bearing receptacle. The sliding surface is designed to contact a strand of a belt element in a dampening manner and the bearing receptacle is designed to align the sliding surface as a function of the alignment of the strand to be dampened, such that the sliding surface defines a travel direction for the strand to be dampened, normal to a transversal direction.

The damper apparatus includes a first rail half and a second rail half, which are interlockingly connected in contact to each other crosswise to the travel direction. The first rail half has a first plunge opening having a first hook lid and the second rail half has a second plunge opening having a second hook lid. The first hook lid is arranged so as to plunge into the second plunge opening behind the second hook lid in a gripping manner.

In the following, reference is made to the mentioned travel direction (also referred to as the longitudinal direction) if, unless explicitly stated otherwise, the transversal direction and axial direction, which are perpendicular thereto and therefore spanning a Cartesian coordinate system, and corresponding terms are used. If the travel direction, the axial direction and the transversal direction are mentioned here, both the positive and the negative direction in the spanned coordinate system are meant.

Furthermore, reference is made to the belt element, which in the assembled state forms a loop around the set running radii of the two conical pulley pairs of a belt transmission, and in relation to the loop reference is made to inside, i.e., enclosed by the belt element in the (imaginary) plane of the loop, and to outside, and corresponding terms are used. Unless explicitly stated otherwise, ordinal numbers used in the previous and subsequent descriptions are used only for the purposes of clear distinction and do not indicate the order or ranking of the designated components. An ordinal number greater than one does not necessarily mean that another such component must be present.

According to the prior art, the damper apparatus is designed for the dampening of a belt element, for example a link chain or a belt, of a belt transmission with two cone pulley pairs. The belt element is designed, for example, as a traction means or as a thrust link belt. This means that the damper apparatus is designed for one of the two strands of the belt element, for example in a configuration as a traction drive for the driving strand, which forms the load strand. Alternatively, the empty strand or both strands are each guided by such a damper apparatus. If guiding the strand is referred to, this also means dampening the strand because the belt element accelerates the upstream cone pulley pair in the travel direction in the strand in a direction that deviates from the ideal tangential direction of the set radii of action of the two cone pulley pairs transversally outward. This results in shaft vibrations that impair efficiency and lead to noise emissions.

For guiding or dampening, the damper apparatus has a sliding surface that rests from the transversal outside on the strand to be guided, i.e., dampened, and/or from the transversal inside on the strand to be guided. The sliding surface thus forms a contact surface which extends in the travel direction and counteracts the transversely oriented amplitude of the shaft vibrations of the strand to be dampened.

A bearing receptacle is provided so that the damper apparatus can follow the (ideal) travel direction that is oriented with the two cone pulley pairs depending on the radii of action set. This bearing receptacle is pivotably mounted on an axially oriented pivot axis formed by a pivoting means, for example in the manner explained at the outset. As a result, the damper apparatus is designed in such a way that the a sliding surface follows the respective orientation of the tangential direction, i.e., the travel direction of the strand to be guided, and abutting the outside or inside of the strand in a dampening manner.

The damper apparatus is designed in several parts, e.g., two parts, and a first rail half and a second rail half are provided. These are connected to each other, for example by running the rail halves in the axial direction on the strand to be guided and then connecting them to each other. For this purpose, the rail halves have contact surfaces via which they are brought into contact with each other, for example axially. To hold the contact surfaces against each other, corresponding interlocking elements are provided which, during assembly, are moved, for example in a bayonet-like manner, relative to each other in the travel direction (or opposite travel direction) and then engage axially behind each other.

In addition, a closing element is often provided that secures the two rail halves against each other in the travel direction and/or in the axial direction so that the rail halves remain in the connected position unless the closing element is actively released from the outside. In one embodiment, a closing element and/or the interlocking elements produce a snap connection, so that the two rail halves lock with each other with a clearly audible click, for example, when they have been correctly positioned with respect to each other.

It has now been found that the damper apparatus not only oscillates about its extent in the travel direction, but also bends upward, i.e., bending vibrations are induced as a result of a torque about the axis of the travel direction or transversal forces in the transversal direction. The torque or the transversal forces are induced, for example because the natural frequency can be in the range of the natural frequency of the strand to be dampened. The noise emissions are due to an uneven and thus insufficient contact of the sliding surfaces over their axial extent. However, this excitation cannot be explained by the flat and uniform effect of the strand on the sliding surfaces; so far, attempts have been made with little success to counteract the sliding surface with a one-piece or axially as firmly as possible braced together (two-piece) sliding surface in conjunction with a stiffening of the sliding surfaces with corresponding transversely external webs and ribs. This excitation perpendicular to the wave movement of the strand to be dampened was neither known nor expected, but it has an influence on the dampening properties and the generation of noise emissions.

The aim is therefore to increase the stiffness of the damper apparatus against such bending vibrations, which was previously considered unnecessary.

It is proposed here for the first rail half to have a first plunge opening having a first hook lid and the second rail half to have a second plunge opening having a second hook lid. In previously known solutions, a receiving opening is provided in one rail half and a corresponding connecting hook is provided in the other rail half, and the mounted connecting hook protrudes into the receiving opening and engages behind an adjacent wall of the receiving opening.

In contrast to previously known solutions, in the assembled state, here the first hook lid is arranged plunging into the second plunge opening, behind the second hook lid. As a result, the, for example axially aligned, length is shortened. For example, this length is halved in an embodiment having the same wall thickness as in a previously known embodiment. This is the case because the first hook lid no longer has to protrude completely through the corresponding (second) receiving opening, but merely plunges into it. The extent of the first plunge opening parallel to the, for example axial, length of the hook lid therefore no longer needs to be added in order to produce an interlocking fit between the first rail half and the second rail half.

In contrast to a previously known connecting hook, the hook used here is referred to as the (first) hook lid, because it partially covers the (first) plunge opening like a lid.

The result of the shortening of the, for example axial, length is an increase in the stiffness of the positive connection, because with the same bending load on this length, the resulting deformation of the hook lid is reduced compared to a previously known connecting hook, halved according to the above example.

The above description of the first hook lid applies accordingly to the second hook lid. The second hook lid is arranged (in the assembled state) so that it plunges into the first plunge opening behind the first hook lid. However, this does not exclude the fact that a pairing, distributed over the two rail halves, consisting of a previously known connecting hook and a previously known receiving opening with an adjoining wall, is provided as an interlocking partner for the connecting hook.

According to one aspect, it is less important to pay attention to the stiffening effects, i.e., to increase the flexural stiffness, than to bring about a change, e.g., an increase, in the natural excitation frequency, which results in a bending vibration of the damper apparatus. Above all, this saves materials and reduces costs.

The damper apparatus proposed here has an increased stiffness and increased strength in the assembled state compared to previously known solutions. In addition, the design is more compact in the axial direction and the required installation space can be reduced in the longitudinal direction. Furthermore, the design is compatible with current manufacturing processes for damper apparatus, for example injection molding. In addition, uniform injection molding tool parts can be used in primary molding processes, and only the pair, e.g., always the same pair, of the hook lid and the plunge opening, have to be produced, instead of a receiving opening and a corresponding connecting hook on the other half of the rail.

In one embodiment, the stiffness of the damper apparatus can also be increased by additional ribs in the area of the installation space that has become free, which previously had to be kept free for the connecting hook engaging behind a wall on the side of the receiving opening.

In one embodiment, the damper apparatus is designed as a slide rail with an outer sliding surface, an inner sliding surface arranged with a transversal distance to the outer sliding surface and aligned parallel in the opposite direction, a bearing receptacle and a web, by which the transversal distance between the outer sliding surface and the inner sliding surface is bridged and the outer sliding surface and the inner sliding surface are connected to each other. The sliding surface is designed to contact a strand of a belt element in a dampening manner and the bearing receptacle is designed to align the sliding surface as a function of the alignment of the strand to be dampened, such that the sliding surface defines a travel direction for the strand to be dampened, normal to a transversal direction. The damper apparatus includes a first rail half and a second rail half, which are interlockingly connected in contact to each other crosswise to the travel direction.

The web establishes the mechanical connection between the two sliding surfaces and for this purpose has stiffening elements, for example ribs, in one embodiment. In one embodiment, the web is only arranged on one (axial) side of the strand. For a high degree of stiffness, a web is provided (axially) to the left and right of the strand, so that a sliding channel surrounding the strand to be guided is formed. In one embodiment, the web is designed with an axial sliding surface towards the strand to be guided, so that the strand is axially guided in the sliding channel or the slide rail is carried away when the strand moves axially as a result of a change in the translation of the belt transmission. A damper apparatus having only one sliding surface also has such a carrier device for axial travel. Alternatively, the damper apparatus, in the case of the slide rail of the slide channel, is axially fixed and the strand to be guided can move axially relative to the sliding surface.

The slide rail is also designed according to one embodiment according to the above description of the damper apparatus. In this respect, reference is made to the above description.

According to an example embodiment of the damper apparatus, the first rail half and the second rail half are constructed identically.

In this embodiment, two identical rail halves are provided, as is already known in some conventional embodiments. During assembly, these can be guided axially to each other on the strand to be dampened, or one half of the rail is already installed and the other can be axially guided. A hook lid (due to identical construction per rail half) is plunged into a corresponding plunge opening of the other rail half. Alternatively, hook lids are provided that are not structurally identical and have a corresponding plunge opening that deviates from the structurally identical construction of the other or at least the components of the rail halves mentioned here. The two rail halves may be structurally identical overall, i.e., formed identically, so that they can be produced using the same production method, in the case of injection molding using a single casting mold. This reduces manufacturing costs and there is no risk of confusion during assembly.

After the hook lid has been plunged into the (corresponding) plunge opening of the other rail half, the rail halves are displaced in opposite directions in the travel direction (or opposite direction) so that the hook lid of the rail halves grip one behind the other. As a result, an interlocking fit, e.g., a force fit with an axial force component, is formed between the two rail halves. The sliding surface is composed, and in the case of a sliding rail, the inner sliding surface and the outer sliding surface are each composed, of half surfaces of the rail halves.

According to an example embodiment of the damper apparatus, the damper apparatus is designed as a slide rail and has an outer sliding surface and an inner sliding surface, which are connected to each other by a web. The first rail half has, in the transversal direction with respect to the strand to be dampened, outside the outer sliding surface and/or inside the inner sliding surface, a plurality of first plunge openings each having a first hook lid, and the second rail half has corresponding second plunge openings each having a second hook lid.

In this embodiment of the damper apparatus as a slide rail, a plurality of, for example two, plunge openings, each having a hook lid, are provided transversely outside the outer sliding surface, i.e., in the assembled state from the strand to be guided, as seen in the transversal direction behind the outer sliding surface. In one embodiment, the damper apparatus is designed additionally or solely inside the inner sliding surface with a, e.g., a plurality of, plunge opening(s) (each) having a hook lid. The outer sliding surface is equipped, for example, by a conventional interlocking pair, for example with a connecting hook and a receiving opening. It has been shown, however, that the previously described reduction in noise emissions by the slide rail is efficient when the hook lid is used outside the outer sliding surface. This increases the stiffness of the axial interlocking connection. An embodiment of a slide rail is described above. For the same components, reference is made to the previous description.

In one embodiment, the plunge openings having the hook lids are arranged symmetrically to such a transverse axis that runs through the pivot axis. In another embodiment, when the load on the sliding surfaces is asymmetrical to this transverse axis, for example a higher load at the entry for the strand to be guided, the plunge openings having the hook lids are arranged asymmetrically to this transverse axis according to this load.

According to an example embodiment of the damper apparatus, the first hook lid and/or the second hook lid is connected to the associated rail half offset in the transversal direction and/or in the travel direction (or in the opposite direction) to the associated plunge opening.

Here a plurality embodiments or arrangements of a hook lid relative to the associated plunge opening (same rail half) are included. The plunge opening must be designed in such a way that the corresponding hook lid of the respective other rail half can be inserted into it, e.g., without tilting the rail halves relative to each other in relation to the travel direction and/or the transversal direction. The hook lid should be stiffly connected to the corresponding rail half. A large connection area is advantageous for this.

In one embodiment, the hook lid is connected to the associated rail half, i.e., the first hook lid is connected to the first rail half, only in the travel direction in front of or behind the plunge opening. In one embodiment, the hook lid is connected to the associated rail half only in the transversal direction inside or outside the plunge opening, e.g., over the entire length of the hook lid aligned along the travel direction (or in the opposite direction). In one embodiment, the hook lid is connected to the associated rail half over part of the length in the travel direction (or in the opposite direction) only in the transversal direction inside and outside the plunge opening. In one embodiment, the hook lid is connected to the associated rail half by a plurality of the connection options described in this paragraph.

All these embodiments of the hook lid allow a (e.g., purely) axial plunging of the hook lid into the corresponding plunge opening, i.e., the first hook lid (of the first rail half) into the second plunge opening (of the second rail half) and at the same time the second hook lid (of the second rail half) into the first plunge opening (of the first half of the rail). The two rail halves can then be displaced against each other in the travel direction (or in the opposite direction) so that the corresponding hook lids engage axially one behind the other. The rail halves can therefore be connected in a bayonet-like manner in the travel direction (or in the opposite direction). For a different connection method, for example a bayonet-like connection with displacement in the axial direction, the hook lids are to be connected differently to the rail half.

In one embodiment, the first hook lid and/or the second hook lid is connected to the associated rail half offset in the transversal direction towards or away from the respective sliding surface to the associated plunge opening.

In one embodiment, the first hook lid and/or the second hook lid is connected to the associated rail half immediately adjacent to the associated plunge opening.

The immediately adjacent embodiment enables a short, free, for example cantilever-like, extent of the hook lid, so that the stiffness of the hook lid is maximized. For a high stiffness, the hook lid is arranged, for example, both transversely and offset in the travel direction with respect to the associated plunge opening and directly adjoins the plunge opening. This means that the hook lid overlaps part of the (closed) rail half, i.e., the connection area, and part of the plunge opening, i.e., the area for the undercut corresponding to the hook lid of the other rail half.

In an example embodiment, the hook lid is formed in one piece with the remaining rail half, for example by injection molding. In one embodiment, the rail half has a core made of a metal, for example steel or aluminum, and is overmolded with a plastic or coated with a plastic.

According to a further aspect, a belt transmission is proposed for a drive train, having at least the following components:
  a transmission input shaft having a first cone pulley pair;
  a transmission output shaft having a second cone pulley pair;
  a belt element by which the first cone pulley pair is connected to the second cone pulley pair in a torque-transmitting manner; and
  a damper apparatus according to an embodiment according to the above description, wherein the damper apparatus abuts a strand of the belt element for dampening the belt element with the sliding surface.

With the belt transmission proposed here, a torque can be transmitted from a transmission input shaft to a transmission output shaft, and vice versa, in a step-up or step-down manner, and the transmission can be continuously adjusted, at least in some areas. A belt transmission is, for example, a so-called CVT (continuous variable transmission) with a traction means or with a thrust link belt. The belt element is, for example, a multi-link chain. The belt element is shifted in opposite directions on the cone pulley pairs from radially inside to radially outside and vice versa, so that a radius of action with a changed running radius is established on a respective cone pulley pair. The ratio of the radii of action results in a transmission of the torque to be transmitted. The two radii of action are connected to each other by an upper and a lower strand, namely a load strand, also known as a driving strand or slack strand, and an empty strand of the belt element.

In the ideal state, the strands of the belt element form a tangential orientation between the two radii of action. This tangential orientation is superimposed by induced wave vibrations, for example caused by the finite division of the belt element as well as due to the premature leaving of the radius of action due to the escape acceleration of the belt element.

The damper apparatus is designed to abut with a sliding surface and a corresponding contact surface of a strand to be dampened, for example the load strand, in such a way that such shaft vibrations are suppressed or at least dampened. Furthermore, for one application, a transversal guide, i.e., in a plane parallel to the formed loop of the belt element, is provided on one or both sides of a guide surface. A slide channel is thus formed in a slide rail with an outer and an inner sliding surface. The strand is thus guided in a parallel plane to the sliding surfaces and the travel direction of the strand lies in this parallel plane. For improved dampening, the sliding surface is designed to be applied tightly on the strand of the belt element. To do this, the sliding surface must be stiff.

So that the damper apparatus can follow the movement of the strand, a pivot bearing is provided on which the damper apparatus rests with its bearing receptacle and can thus execute the pivoting movement as described above.

The components of the belt transmission are usually enclosed and/or supported by a transmission housing. For example, the pivot bearing for the bearing receptacle is fastened as a bearing tube to the transmission housing and/or is movably supported thereon. The input shaft and the output shaft extend from outside into the transmission housing and may be supported on the transmission housing by bearings. The cone pulley pairs are housed by the gear housing, and the gear housing forms the abutment for the axial actuation of the movable cone pulleys, for example. Furthermore, the gear housing may form connections for attaching the belt transmission and, for example, for the supply of hydraulic fluid. For this purpose, the transmission housing has a large number of boundary conditions and must fit into a given installation space. This interaction results in an inner wall that limits the shape and movement of the components.

The belt transmission proposed here has one or two damper apparatus, of which at least one damper apparatus has a low tendency for bending vibrations as described above. This is achieved by the plunge openings and hook lids described above. This improves the dampening effect and thus the efficiency of the belt transmission and reduces noise emissions.

According to a further aspect, a drive train is proposed, having a drive assembly with a drive shaft, a consumer and a belt transmission according to an embodiment as described above. The drive shaft for torque transmission by the belt transmission can be connected with the consumer with changeable transmission ratio.

The drive train is designed to transmit a torque provided by a drive assembly, for example an internal combustion engine or and/an electric machine, and output via the drive shaft thereof, i.e., the combustion shaft and/or the (electric) rotor shaft, for example, for use as required, i.e., taking into account the required speed and the required torque. One use is, for example, an electrical generator to provide electrical energy. To transmit the torque in a targeted manner and/or by a manual transmission with different transmission ratios, the use of the belt transmission described above provides a large transmission ratio spread in a small space, and allows the drive assembly to be operated with a small optimal speed range.

Conversely, a receiving of an inertia energy introduced by, for example, a drive wheel, which then forms a drive assembly in the above definition, can be implemented by the belt transmission on an electric generator for recuperation, i.e. the electrical storage of braking energy, with a correspondingly configured torque transmission line. Furthermore, in an example embodiment, a plurality of drive assemblies is provided, which can be operated in series or in parallel or can be operated in a decoupled manner from each other and the torque of which can be made available as required by a belt transmission according to the above description. One exemplary application is a hybrid drive with an electric machine and an internal combustion engine.

The belt transmission proposed here enables the use of a damper apparatus that efficiently utilizes the available installation space, so that good dampening properties can be achieved due to an increase in the stiffness of the connection between the two rail halves, i.e., increased stiffness against said bending vibrations. The noise emissions of such a drive train are thus reduced. The efficiency can also be increased as a result of a reduction in the vibrations. In addition, reduced wear can be achieved on the belt element and thus the life of the belt transmission can be extended.

According to a further aspect, a motor vehicle is proposed, with a drive wheel, which can be driven by a drive train according to an embodiment as described above.

Most motor vehicles today have a front-wheel drive and sometimes arrange the drive assembly, for example an internal combustion engine and/or an electric machine, in front of the driver's cab and transversely to the main direction of travel. The radial installation space is particularly small in such an arrangement, and it is therefore advantageous to use a small-sized belt transmission. The use of a belt transmission in motorized two-wheeled vehicles is similar, for which an ever-increasing performance compared with the previously known two-wheeled vehicles with the same installation space is required. With the hybridization of drive trains, this problem is exacerbated.

This problem is exacerbated in the case of passenger cars in the small car category according to the European classification. The assemblies used in a passenger car of the small car category are not significantly reduced in size compared to passenger cars of larger car categories. Nevertheless, the available installation space for small cars is smaller.

In the motor vehicle proposed here with the drive train described above, low noise emission is achieved, which means that less effort is required with regard to sound insulation. This means that less space is required for the belt transmission. It is also possible, alternatively or additionally, to set up low noise emissions and a long service life.

Passenger cars are assigned to a vehicle category according to, for example, size, price, weight, and performance, wherein this definition is subject to constant change based on the needs of the market. In the US market, vehicles in the small car and microcar categories are assigned to the subcompact car category according to European classification, while in the British market they correspond to the super-mini car and city car categories respectively. Examples of the microcar category are the Volkswagen up! or Renault Twingo. Examples of the small car category are the Alfa Romeo Mito, Volkswagen Polo, Ford Fiesta or Renault Clio.

BRIEF DESCRIPTION OF THE DRAWINGS

The above disclosure is explained in detail below based on the relevant technical background with reference to the associated drawings, which show example embodiments. The disclosure is in no way restricted by the purely schematic drawings, while it should be noted that the drawings are not dimensionally accurate and are not suitable for defining proportions. In the figures, FIG. 1 shows a conventional damper apparatus with connecting hooks;

FIG. 2 shows a damper apparatus with hook lids;

FIG. 3 shows a conventional connecting hook;

FIG. 4 shows a hook lid in a first embodiment;

DETAILED DESCRIPTION

Figure 5:
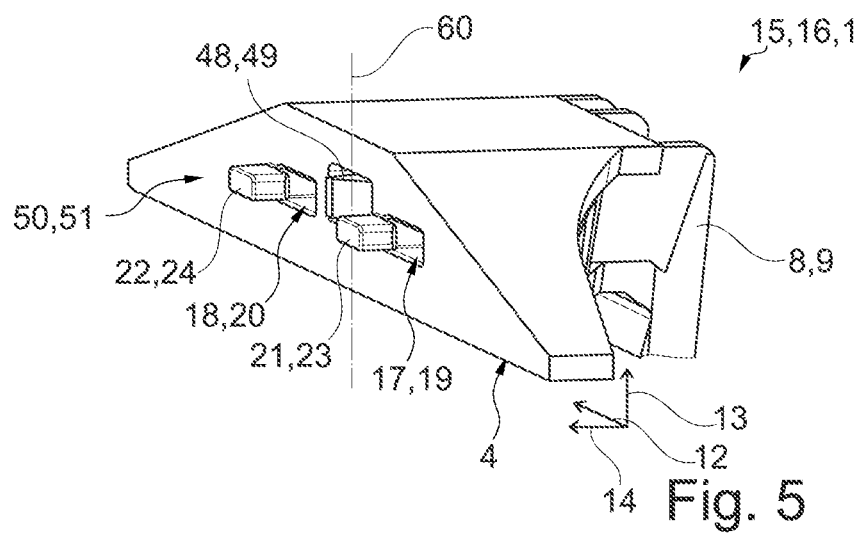
FIG. 5 shows a slide rail with hook lids in the first embodiment.

FIG. 1 shows a section of a conventional damper apparatus 43 in a sectional plan view, in which a first rail half 15 is connected to a second rail half 16 in a bayonet-like manner. For this purpose, the first rail half 15 and the second rail half 16 are offset from each other in the travel direction 12 with their first contact surface 50 and their second contact surface 51 set against each other in the axial direction 14.

The first conventional connecting hook 44 is guided through the second conventional receiving openings 47 and the second conventional connecting hook 46 is inserted through the first conventional receiving openings 45. The connecting hooks 44 and 46 are therefore inserted in the axial direction 14 into the corresponding receiving openings 47 and 45, respectively. The rail halves 15 and 16 are then shifted in relation to each other in the travel direction 12 into the position shown, so that the conventional connecting hooks 44 and 46 grip behind a wall of the other rail halves 16 and 15, respectively. A first closing element 48 and a second closing element 49 are additionally (optionally) provided, which lock against each other when the two rail halves 15 and 16 are moved relative to each other in the travel direction 12 and thus hold the two rail halves 15 and 16 in the position shown.

In the illustration above and below with dashed lines, i.e. optionally, a first web 8 and a second web 9 indicated, which, in one embodiment of the conventional damper apparatus 43 as a slide rail, mechanically connect an outer sliding surface 4 and an inner sliding surface 5 in the transversal direction 13 at a transversal distance 7 (see FIG. 8).

In FIG. 2, shown in the same way as in FIG. 1, a damper apparatus 1 is shown, in which, for the sake of clarity, most of the components are identical to the representation in FIG. 1. In this respect, reference is made to the description there.

Here in FIG. 2, instead of the conventional connecting hooks 44, 46 and receiving openings 45, 47, a front plunge opening 17 and 19, respectively, and a rear plunge opening 18 and 20, respectively, are provided. Each plunge opening 17 to 20, is assigned an associated hook lid 21 to 24, wherein the hook lids 21 to 24 form the undercut required for the interlocking fit (in the axial direction 14) for a corresponding hook lid 21 to 24 of the respective other rail half 15 or 16.

In this embodiment, the axial thickness of the hook lids 21 to 24 corresponds to the axial depth of the plunge openings 17 to 20. The axial thickness of the hook lids 21 to 24 can be made thinner or thicker. According to the axial thickness of the hook lids 21 to 24, stiffening elements of the rail halves 15 and 16 can be moved axially further to the respective contact surface 50 or 51, as can clearly be seen in comparison to the embodiment in FIG. 1 with the axially extending stiffening ribs shown in the area of the conventional connecting hooks 44 and 46.

As in FIG. 1, the two rail halves 15 and 16 in FIG. 2 are designed identically, so that they can be produced, for example, with the aid of the same injection mold. Here (as shown in the second rail half 16) the (second) front plunge opening 19 and the (second) rear plunge opening 20, as well as the associated hook lids 23 and 24, are not designated in the order in the travel direction 12, but vice versa.

In FIG. 3, a detail of the first rail half 15 the conventional damper apparatus 43, as shown in FIG. 1, is shown in section. The conventional first connecting hook 44 can be seen here, which is connected to the remaining rail half 15 by a (single) connection point 53. In addition, the conventional first connecting hook 44 has a conventional axial length 52 in order to protrude into the corresponding receiving openings 47 (see FIG. 1) of the other (second) rail half 16 and access the adjacent wall of the corresponding receiving openings 47. The conventional connecting hook 44 is thus soft and the corresponding receiving opening 47 is stiffer. It should be pointed out here that the opening shown (in the travel direction 12 in an overlap with the connecting hook 44) in the contact surface is 50 optional and has no function for connecting the other (second) rail half 16 (see FIG. 1). In the case of an identical embodiment of the two rail halves 15 and 16, as shown in FIG. 1, the description in this paragraph applies accordingly to the second rail half.

In FIG. 4, a detail of the first rail half 15 of the damper apparatus 1, as shown in FIG. 2, is shown in section. The first front hook lid 21 can be seen here, the extent of which in the travel direction 12 (here the coordinate system as shown in FIG. 3 applies) begins with little or no axial distance from the first contact surface 50. The first hook lid 21 is arranged in the travel direction 12 directly adjacent to the associated first front plunge opening 17. The connection point 53 corresponds approximately to the embodiment as in FIG. 3. However, because the conventional axial length 52 is almost negligibly short or omitted, the stiffness of the first front hook lid 21 is increased compared to the conventional connecting hook 44, as shown in FIG. 3.

Compared to the adjoining wall of the conventional receiving opening 47 or 45 that forms the undercut, the undercut formed by the hook lid 21 is somewhat softer, but the stiffness of both rail halves 15 and 16 can now be implemented identically. As a result, a uniform load behavior is achieved, for example with an identical embodiment of the two rail halves 15 and 16 (see FIG. 2) a load behavior that is symmetrical to the contact surfaces 50 and 51. The plunge opening 17 is designed for plunging of the second rear hook lid 24 of the other rail half 16 (see FIG. 2).

The hook lid 21 (and the other hook lids 22 to 24) does not necessarily protrude in the axial direction 14 through the corresponding plunge opening 17 (or 18 to 20), but rather completely overlapping (as shown in FIG. 2) or merely protruding. This depends on the axial thickness of the respective hook lid 21 to 24 and the axial depth of the corresponding plunge opening 17 to 20 or the axial position of the undercut surface formed. The description of the first front hook lid 21 and the associated first front plunge opening 17 applies, for example, in an embodiment according to FIG. 2, in the same way for the first rear hook lid 22 and the associated first rear plunge opening 18. In the case of an identical embodiment of the two rail halves 15 and 16, as shown in FIG. 2, the description above applies accordingly to the second rail half.

FIG. 5 shows a three-dimensional view of a section of a first rail half 15 or a second rail half 16 of a damper apparatus 1, as shown, for example, in FIGS. 2 and 4. The rail half 15 or 16 has a first web 8 or a second web 9 extending in the transversal direction 13. An inner sliding surface 5 adjoins the web 8 or 9 in the transversal direction 13 at a transversal distance 7 (see FIG. 8). Here, only the portion of the rail half 15 or 16 is shown which forms the outer sliding surface 4, wherein only the partial surface of the respective rail half 15 or 16 is shown here.

In the illustration according to FIG. 5, the first contact surface 50 or the second contact surface 51 can be seen and show the first front hook lid 21 and the second front hook lid 23, having the associated first front plunge opening 17 or the associated second front plunge opening 19, as well as the first rear hook lid 22 or the second rear hook lid 24, having the associated first rear plunge opening 18 or the associated second rear plunge opening 20. The hook lids 21, 23 and 22, 24 are (optionally) arranged for symmetrical force absorption in relation to a transversal axis 60. (The transversal axis 60 runs parallel to the transversal direction 13 and lies here in the illustration in the plane of the contact surface 50, 51). Independently of this, a first closing element 48 or a second closing element 49 is optionally provided (approximately centrally here) between the hook lid 21, 23 and 22, 24, as described with reference to FIG. 1.

Figure 6:
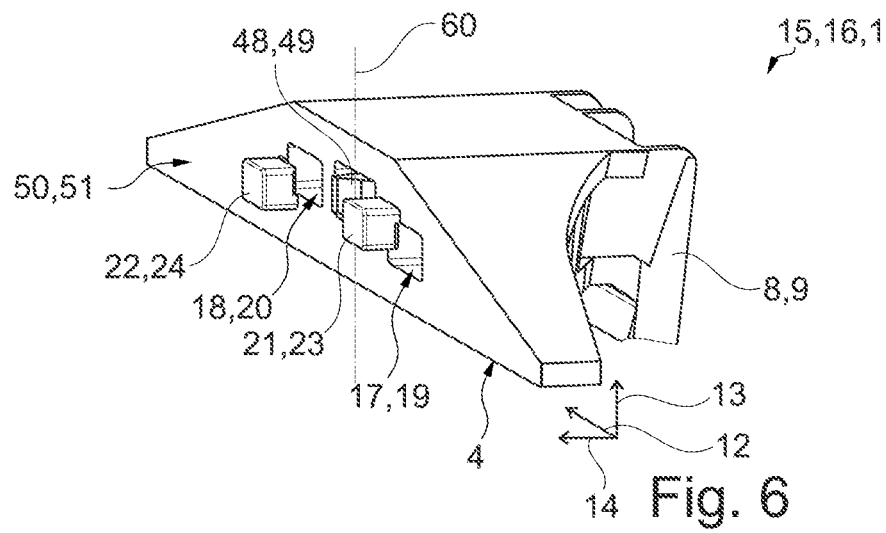
FIG. 6 shows a slide rail with hook lids in a second embodiment.

In FIG. 6 a variant of the first rail half 15 or the second rail half 16 of a damper apparatus 1 is shown in detail in a three-dimensional view, wherein the rail half 15, 16 shown is almost identical to the embodiment according to FIG. 5 for the sake of clarity. Here, however, the hook lids 21, 23 and 22, 24 are offset in the transversal direction 13 with respect to the one associated plunge opening 17, 19 or 18, 20 in addition to an offset in the travel direction 12 (see FIG. 4) with respect to the one associated plunge opening 17, 19 or 18, 20. This creates an additional stiffening of the hook lids 21, 23 and 22, 24.

Figure 7:
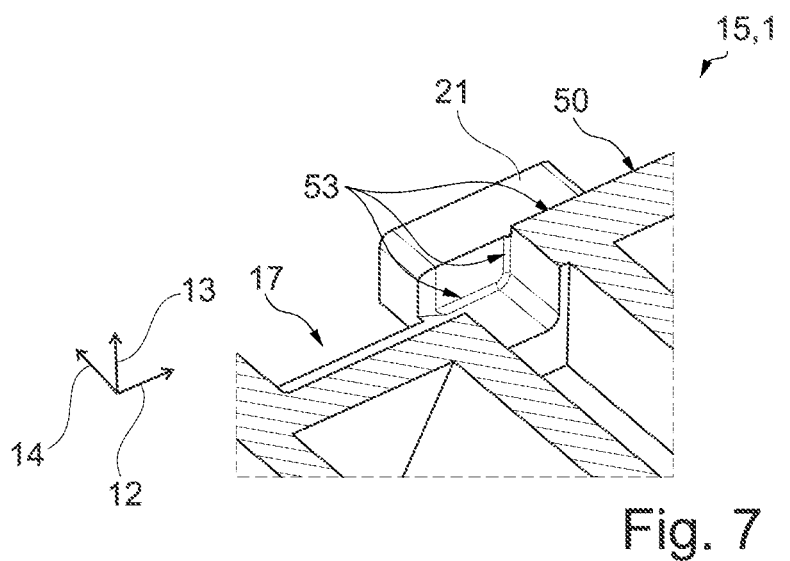
FIG. 7 shows a hook lid in the second embodiment.

FIG. 7 shows a section of a first rail half 15 of a damper apparatus 1 as shown in FIG. 6. It can be seen here how the first front hook lid 21 is provided with a multiplicity of connection points 53 as a result of the additional offset in the transversal direction 13 provided for the offset in the travel direction 12 relative to the associated first front plunge opening 17. For a description of the other components, reference is made to the description of FIG. 4. The description of the first front hook lid 21 and the associated first front plunge opening 17 applies, for example, in an embodiment according to FIG. 2, in the same way for the first rear hook lid 22 and the associated first rear plunge opening 18. In the case of an identical embodiment of the two rail halves 15 and 16, as shown in FIG. 2, the description in this paragraph applies accordingly to the second rail half.

Figure 8:
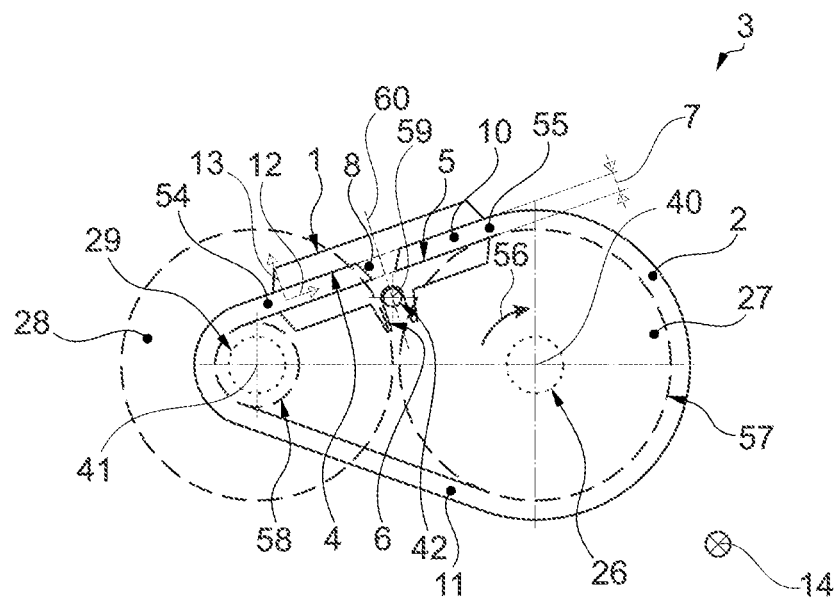
FIG. 8 shows a belt transmission with a strand guided by a slide rail.

FIG. 8 schematically shows a damper apparatus 1 in a belt transmission 3. A first strand 10 of a belt element 2 is guided by the damper apparatus 1 and is thus dampened. The belt element 2 connects a first cone pulley pair 27 to a second cone pulley pair 28 in a torque-transmitting manner. A first radius of action 57, on which the belt element 2 runs, is in contact with the input-side cone pulley pair 27 through a corresponding spacing in the axial direction 14 (corresponding to the orientation of the rotation axes 40 and 41), which here for example is rotatably connected in a torque-transmitting manner with a transmission input shaft 26 around an input-side axis of rotation 40. A second radius of action 58, on which the belt element 2 runs, is in contact with the output-side cone pulley pair 28 through a corresponding spacing in the axial direction 14, which here for example is rotatably connected in a torque-transmitting manner with a transmission output shaft 29 around an output-side axis of rotation 41. The (changeable) ratio of the two radii of action 57 and 58 results in the transmission ratio between the transmission input shaft 26 and the transmission output shaft 29.

Between the two cone pulley pairs 27 and 28, the first strand 10 (shown here) and the second strand 11 are shown in an ideal tangential orientation, so that the parallel direction of the travel direction 12 is established. The transversal direction 13 shown here is defined as the third spatial axis perpendicular to the travel direction 12 and perpendicular to the axial direction 14, wherein this is understood as a (radius of action-dependent) co-moving coordinate system. Therefore, both the travel direction 12 shown and the transversal direction 13 apply only to the damper apparatus 1 (here designed as a slide rail) shown and the first strand 10, and only in the case of the set input-side radius of action 57 and corresponding output-side radius of action 58 shown.

The damper apparatus 1, designed as a slide rail, rests with its outer sliding surface 4 and its inner sliding surface 5 connected thereto by the web 8 on the first strand 10 of the belt element 2. So that the sliding surfaces 4 and 5 can follow the variable tangential orientation, i.e., the travel direction 12, when the radii of action 57 and 58 change, the bearing receptacle 6 is mounted on a pivot 42 with a pivot axis 59, for example a conventional holding tube. As a result, the damper apparatus 1 is mounted pivotably about the pivot axis 59. In the exemplary embodiment shown, the pivoting movement is composed of a superposition of a pure angular movement and a transverse movement, so that, in deviation from a movement along a circular path, a movement along an oval (steeper) curved path occurs.

In the direction of rotation 56 shown by way of example, and when the torque is input via the transmission input shaft 26, the damper apparatus 1 in the illustration forms the inlet side 54 on the left and the outlet side 55 on the right. When running as a traction drive, the first strand 10 then forms the load strand as the driving strand and the second strand 11 forms the empty strand. If the belt 2 is designed as a thrust link belt, under otherwise identical conditions, either the first strand 10 is guided as an empty strand by the damper apparatus 1 or the first strand 10 is designed as a load strand and a slack strand and:

the direction of rotation 56 and the travel direction 12 are reversed when torque is input via the first pair of cone pulleys 27; or the transmission output shaft 29 and the transmission input shaft 26 are interchanged so that the second pair of cone pulleys 28 forms the torque input. In this embodiment, the damper apparatus is (optionally) designed symmetrically to the transverse axis 60, which runs through the pivot axis 59, and/or symmetrically to a center plane spanned by the travel direction 12 and the transversal direction 13 between the two rail halves 15 and 16 (see, for example, FIG. 2).

Figure 9:
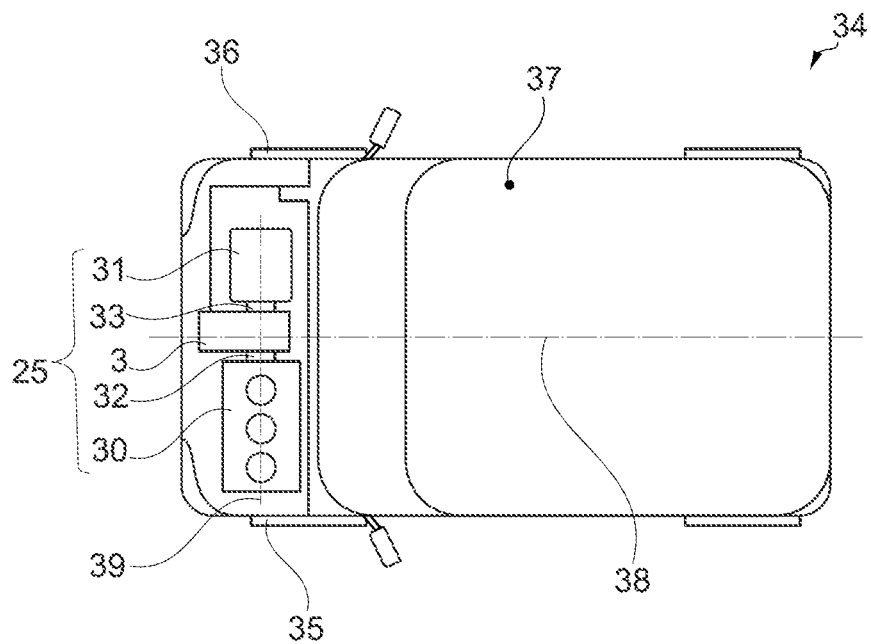
FIG. 9 shows a drive train in a motor vehicle with a belt transmission.

FIG. 9 shows a drive train 25 arranged in a motor vehicle 34 with the motor axis 39 thereof (optionally) transverse to the longitudinal axis 38 (optionally) in front of the driver's cab 37. In this case, the belt transmission 3 is connected on the input side to the drive shafts of the drive units, here namely an internal combustion engine 30 with a combustion shaft 32 and an electric machine 31 with a rotor shaft 33. From these drive units 30, 31 or via their drive shafts 32, 33, a torque for the drive train 25 is delivered simultaneously or at different times. However, a torque can also be absorbed, for example by the internal combustion engine 30 for engine braking and by the electric machine 31 for recuperation of braking energy. On the output side, the belt transmission 3 is connected to a purely schematically illustrated output, so that here a left drive wheel 35 and a right drive wheel 36 can be supplied with torque by the drive assemblies 30 and 31 with a variable transmission ratio.

With the slide rail proposed here, reduced noise emission and improved efficiency can be achieved as a result of improved hook geometry.

REFERENCE NUMERALS

1 Damper apparatus
2 Belt element
3 Belt transmission
4 Outer sliding surface
5 Inner sliding surface
6 Bearing receptacle
7 Transversal distance
8 First web
9 Second web
10 First strand
11 Second strand
12 Travel direction
13 Transversal direction
14 Axial direction 15 First rail half
16 Second rail half
17 First front plunge opening
18 First rear plunge opening
19 Second front plunge opening
20 Second rear plunge opening
21 First front hook lid
22 First rear hook lid
23 Second front hook lid
24 Second rear hook lid
25 Drive train
26 Transmission input shaft
27 First cone pulley pair
28 Second cone pulley pair
29 Transmission output shaft
30 Internal combustion engine
31 Electric machine
32 Combustion shaft
33 Rotor shaft
34 Motor vehicle
35 Left drive wheel
36 Right drive wheel
37 Driver's cab
38 Longitudinal axis
39 Motor axis
40 Input-side axis of rotation
41 Output-side axis of rotation
42 Pivoting means
43 Conventional damper apparatus
44 Conventional first connecting hook
45 Conventional first receiving opening
46 Conventional second connecting hook
47 Conventional second receiving opening
48 First closing element
49 Second closing element
50 First contact surface
51 Second contact surface
52 Conventional axial length
53 Connection point
54 Inlet side
55 Outlet side
56 Direction of rotation
57 Input-side radius of action
58 Output-side radius of action
59 Pivot axis
60 Transversal axis

The invention claimed is:

1. A damper apparatus for a belt element of a belt transmission, comprising:
a sliding surface arranged to contact a strand of the belt element to dampen the belt element;
a bearing receptacle arranged to align the sliding surface with the strand such that the sliding surface defines a strand travel direction, normal to a transversal direction;
a first rail half comprising a first contact surface and a first plunge opening with a first hook lid; and
a second rail half comprising a second contact surface, contacting the first contact surface, and a second plunge opening with a second hook lid, wherein:
the first rail half and the second rail half are interlockingly connected in contact to each other crosswise to the strand travel direction;
the first hook lid extends from the first contact surface into the second plunge opening behind the second hook lid in a gripping manner; and
the second hook lid extends from the second contact surface into the first plunge opening behind the first hook lid in a gripping manner.

2. The damper apparatus of claim 1, wherein the first rail half and the second rail half are identically constructed.

3. The damper apparatus of claim 1, further comprising:
an outer sliding surface; and
an inner sliding surface connected to the outer sliding surface by a web, wherein:
the first rail half comprises a plurality of first plunge openings with respective first hook lids arranged in the transversal direction;
the second rail half comprises a plurality of second plunge openings with respective second hook lids corresponding to respective first plunge openings; and
the plurality of first plunge openings is disposed:
outside the outer sliding surface; or
inside the inner sliding surface.

4. The damper apparatus of claim 1, wherein the first hook lid is connected to the second rail half offset in the transversal direction relative to the second plunge opening.

5. The damper apparatus of claim 4, wherein the first hook lid is connected to the second rail half directly adjacent to the second plunge opening.

6. The damper apparatus of claim 1, wherein the first hook lid is connected to the second rail half offset in the strand travel direction relative to the second plunge opening.

7. The damper apparatus of claim 6, wherein the first hook lid is connected to the second rail half directly adjacent to the second plunge opening.

8. A belt transmission for a drive train, comprising:
a transmission input shaft comprising a first cone pulley pair;
a transmission output shaft comprising a second cone pulley pair;
a belt element connecting the first cone pulley pair to the second cone pulley pair in a torque-transmitting manner; and
the damper apparatus of claim 1 abutting the strand of the belt element for dampening the belt element with the sliding surface.

9. A drive train, comprising:
a drive assembly comprising:
a drive shaft;
a consumer; and
the belt transmission of claim 8 for connecting the drive shaft to the consumer with a changeable transmission ratio.

10. A motor vehicle, comprising:
a drive wheel; and
the drive train of claim 9 for driving the drive wheel.

* * * * *